(12) United States Patent
Rui et al.

(10) Patent No.: US 9,351,325 B2
(45) Date of Patent: May 24, 2016

(54) POLICY CONTROL METHOD AND SYSTEM FOR CONVERGED NETWORK

(71) Applicant: ZTE CORPORATION, Senzhen, Guangdong Province (CN)

(72) Inventors: Tong Rui, Shenzhen (CN); Xiaoyun Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/371,763

(22) PCT Filed: Dec. 17, 2012

(86) PCT No.: PCT/CN2012/086759
§ 371 (c)(1),
(2) Date: Jul. 11, 2014

(87) PCT Pub. No.: WO2013/104234
PCT Pub. Date: Jul. 18, 2013

(65) Prior Publication Data
US 2014/0378131 A1 Dec. 25, 2014

(30) Foreign Application Priority Data
Jan. 12, 2012 (CN) .......................... 2012 1 0008947

(51) Int. Cl.
*H04W 4/00* (2009.01)
*H04W 76/02* (2009.01)
(Continued)

(52) U.S. Cl.
CPC ......... *H04W 76/022* (2013.01); *H04L 41/0893* (2013.01); *H04M 15/66* (2013.01); *H04M 15/8038* (2013.01); *H04M 2215/2033* (2013.01); *H04W 84/12* (2013.01)

(58) Field of Classification Search
CPC ..... H04L 47/20; H04L 12/14; H04L 41/0893; H04W 84/12; H04W 36/36; H04W 28/16; H04W 76/022; H04M 15/66; H04M 15/8038; H04M 2215/2033
USPC .......................................................... 455/433
See application file for complete search history.

(56) References Cited

U.S. PATENT DOCUMENTS

2006/0209768 A1* 9/2006 Yan ................... H04L 29/12311
370/338
2010/0281170 A1* 11/2010 Rui ..................... H04L 12/1407
709/227

(Continued)

FOREIGN PATENT DOCUMENTS

CN 101094081 A 12/2007
CN 101677437 A 3/2010
(Continued)

OTHER PUBLICATIONS

ETSI TS 123 261 V10.1.0 (May 2011), IP flow mobility and seamless WLAN offload Stage 2.*
(Continued)

*Primary Examiner* — Timothy Pham
(74) *Attorney, Agent, or Firm* — Plumsea Law Group, LLC

(57) ABSTRACT

A policy control method for a converged network comprises: in a roaming scenario, after learning that a user equipment (UE) accesses a mobile network through a wireless local area network (WLAN) access, a visited policy and charging rules function (V-PCRF) establishing a subsession serving WLAN Offload when establishing an S9 session to a home policy and charging rules function (H-PCRF), and carrying a WLAN Offload instruction. With the present document, the WLAN offload data can be distinguished from data routed back to an EPC network in the roaming scenario, thereby delivering policy control for the WLAN offload data.

7 Claims, 12 Drawing Sheets

(51) Int. Cl.
  *H04L 12/24* (2006.01)
  *H04M 15/00* (2006.01)
  *H04W 84/12* (2009.01)

(56) References Cited

U.S. PATENT DOCUMENTS

| | | | | |
|---|---|---|---|---|
| 2011/0173332 A1* | 7/2011 | Li | ............................ | H04L 12/14 709/227 |
| 2011/0222523 A1* | 9/2011 | Fu | ......................... | H04W 48/10 370/338 |
| 2012/0281674 A1* | 11/2012 | Jackson | .............. | H04L 12/1403 370/331 |
| 2013/0089013 A1* | 4/2013 | Carnero Ros | ......... | H04W 28/12 370/310 |
| 2013/0279401 A1* | 10/2013 | Sander | .................. | H04W 48/18 370/328 |

FOREIGN PATENT DOCUMENTS

| | | |
|---|---|---|
| CN | 102014517 A | 4/2011 |
| WO | 2011/047726 A1 | 4/2011 |

OTHER PUBLICATIONS

BB2 Scope and Scenario Discussion, ZTE, 3GPP TSG-SA WG2 Meeting #86, Nov. 14, 2011, S2-113075, Naantali, Finland.
Include WLAN as RAT 1 Technology, Intel, 3GPP TSG-SA5, Nov. 14-Nov. 18, 2011, S5-113607, San Francisco, USA.
Extended European Search Report issued Nov. 24, 2015 in European Patent Application No. 12865087.6.

* cited by examiner

POLICY CONTROL METHOD AND SYSTEM FOR CONVERGED NETWORK

TECHNICAL FIELD

The present document relates to the field of mobile communications, and more specifically, to a policy control method and system for a converged network.

BACKGROUND OF THE INVENTION

The 3rd Generation Partnership Project (referred to as 3GPP) Evolved Packet System (referred to as EPS) consists of Evolved Universal Terrestrial Radio Access Network (referred to as the E-UTRAN), Mobility Management Entity (referred to as MME), serving gateway (referred to as S-GW), Packet Data Network Gateway (referred to as P-GW or PDN GW), Home Subscriber Server (referred to as HSS), 3GPP Authentication, Authorization and Accounting (referred as AAA) server, Policy and Charging Rules Function (referred to as PCRF) entity and other support nodes.

FIG. 1 is an architectural diagram of an EPS system according to the related art. As shown in FIG. 1, the MME is responsible for control plane related work such as mobility management, processing non-access layer signaling, and managing user mobility management context; the S-GW is an access gateway device connected with the E-UTRAN, forwards data between the E-UTRAN and the P-GW, and is responsible for buffering the paging wait data; the P-GW is a border gateway of the EPS and the packet data network (referred to as PDN), and is responsible for the PDN access, forwarding data between the EPS and the PDN, and other functions; both the S-GW and the P-GW are gateways in the core network; the PCRF is a policy and charging rules function entity, and is connected to the operator's Internet Protocol (referred to as IP) traffic network via the receiving interface Rx, and accesses the traffic information, in addition, it is connected with the gateway devices in the network via the Gx/Gxa/Gxc interfaces, and is responsible for initiating an IP bearer establishment, ensuring the Quality of Service (referred to as QoS) of the traffic data, and performing charging control.

The EPS supports interworking with a non-3GPP system, wherein the interworking with the non-3GPP system is implemented through the interface S2a/b/c, and the P-GW works as an anchor point between the 3GPP and non-3GPP systems. In the EPS system architectural diagram, the non-3GPP system is divided into trusted non-3GPP IP access and untrusted non-3GPP IP access. The trusted non-3GPP IP access may directly connect to the P-GW via the S2a Interface; the untrusted non-3GPP IP access needs to connect to the P-GW via an Evolved Packet Data Gateway (referred to as ePDG, since it is an untrusted access, the ePDG at this point is primarily responsible for security), and the interface between the ePDG and the P-GW is S2b; and S2c provides user plane related control and mobility support between the User Equipment (referred to as UE) and the P-GW, and its supporting mobility management protocol is the Mobile IPv6 Support for Dual Stack Hosts and Routers (referred to as DSMIPv6).

In the EPS system, the Policy and Charging Enforcement Function (referred to as PCEF) entity exists in the P-GW, and the PCRF and P-GW exchange information via the Gx interface (see FIG. 1). When the interface between the P-GW and S-GW is based on PMIPv6, the S-GW also has a Bearer Binding and Event Report Function (referred to as the BBERF) entity to perform QoS control on the traffic data flow, and the S-GW and the PCRF exchange information through the Gxc interface (see FIG. 1). When accessing through the trusted non-3GPP access system, the trusted non-3GPP access gateway also has the BBERF. The trusted non-3GPP access gateway and the PCRF exchange information via the Gxa interface (see FIG. 1). When the UE is roaming, the S9 interface works as an interface between the home PCRF and the visited PCRF, meanwhile provides the UE with traffic Application Function (referred to as AF), and sends the PCRF via the Rx interface the traffic information for developing policy and charging control (PCC) policy. In the 3GPP, the corresponding PDN network can be found through the Access Point Name (referred to as APN). Generally, a connection from the UE to the PDN is called as an IP connectivity access network (referred to as IP-CAN) session. In a process of establishing the IP-CAN session, the BBERF and the PCEF respectively establish Diameter sessions with the PCRF, and the Diameter sessions are used to send the policy and charging information for controlling the IP-CAN session and information for developing the policy.

The corresponding BBF (Broadband Forum) proposed a broadband policy control architecture BPCF (Broadband Policy Control Function), specifically as shown in FIG. 2, the BPCF's main function is to develop appropriate policies; the PEP (Policy Enforcement Point) usually resides in a fixed network transmission equipment, such as BRAS (Broadband Remote Access Server)/BNG (Broadband Network Gateway), and executes in accordance with the appropriate policies developed by the BPCF; the AAA stores user's subscription information; the AF (Application Function) develops policies for the BPCF, and provides the corresponding traffic information. Currently the BPCF architecture is still relatively sketchy, and further details are still under development.

Nowadays, the operators are very interested in the FMC (Fixed Mobile Convergence,) scenario, that is, research based on the 3GPP and BBF interoperability. Especially for some large-scale operators having both mobile and fixed broadband networks, such operators want to be able to provide users with unified policy control, allowing users to have consistent service experience after accessing through different accessing ways (for example, 3GPP access in the mobile network, and WLAN access in the fixed network). In order to provide a unified policy control, there is also a need for the convergence of the PCRF (a policy entity for which a mobile network provides control) and the BPCF (a policy entity for which a fixed broadband network provides policy control). Since the current BBF forum does not specify how to implement the BPCF, while there are plans to use the PCRF to achieve the BPCF function in the 3GPP forum, the subsequent converged policy control entity is named as PCRF hereinafter.

When a user develops a service, the user can selectively route the data back to the EPC network, or directly send the data out through the local fixed network transmission equipment BRAS/BNG. The scenarios in which the user accesses the mobile core network via the BBF fixed network (such as WLAN access) can be divided into three categories: 1. untrusted S2b access, wherein, as shown in FIG. 3, the UE accesses via a fixed network equipment, and an IP-Sec tunnel is established between the UE and the ePDG (ePDG acting as a security gateway) for data transmission, and then the UE accesses the EPS core network through the ePDG, the S2b interface between the ePDG and the P-GW can use the PMIP (Proxy Mobile IP) or the GTP (GPRS Tunneling Protocol), and there may be a Gxb* interface (the user of this interface transfers the tunnel information of user access) existing between the ePDG and the PCRF; 2. untrusted S2c access, wherein, as shown in FIG. 4, in this case the DSMIP tunnel is used between the UE and the P-GW, and there is also one layer of IP-Sec tunnel encapsulated in the outer layer of the DSMIP tunnel which is between the UE and the ePDG, and there is no tunnel between the ePDG and the P-GW at this point; 3. trusted S2c access, wherein, as shown in FIG. 5, in this case, it is still the DSMIP tunnel between the UE and the P-GW, but since it is a trusted access relationship, no ePDG exists at this time.

When the UE roams to a visited network, there are two methods for the traffic to be routed to the EPC core network: Home Routed (FIGS. 6a, 6b, 6c) and Local Breakout (FIGS. 7a, 7b, 7c), and the difference is whether the P-GW's location is in the home network or the visited network. In a WLAN Offload connection, however, this part of data are always routed out through the BRAS/BNG in the visited network.

In the case that both the WLAN Offload data and the data routed back to the EPC network exist in this roaming scenario, there is no solution to distinguish these two parts of data in the prior art, thus charging and policy control cannot be performed for these two kinds of data.

SUMMARY OF THE INVENTION

To solve the technical problem, the present document provides a policy control method and system for a converged network to distinguish WLAN offload data from data routed back to an EPC network in a roaming scenario, and then distribute the policy control to the WLAN offload data.

To solve the abovementioned technical problem, the present document provides a policy control method for a converged network, comprising:

in a roaming scenario, after learning that a user equipment (UE) accesses a mobile network through a wireless local area network (WLAN) access, a visited Policy and Charging Rules Function (V-PCRF) establishing a subsession serving WLAN Offload when establishing an S9 session to a home policy and charging rules function (H-PCRF), and carrying a WLAN Offload instruction.

Said carrying WLAN Offload instruction comprises:
carrying a WLAN Offload identifier;
carrying a specific subsession ID; or
not carrying information of an access point name (APN).

The method further comprises:
the H-PCRF sending the V-PCRF a developed policy and charging control (PCC) policy and/or quality of service (QoS) policy over the subsession established for serving the WLAN Offload.

The V-PCRF learns that the UE accesses the mobile network via a WLAN access by means of:
receiving a session establishment request sent by an authentication authorization accounting (AAA) server;
receiving a session establishment request sent by a broadband access server or a broadband gateway;
receiving a gateway control session establishment request sent by an Evolved packet data gateway (ePDG);
receiving an IP connectivity access network (IP-CAN) session request sent by a packet data network gateway (P-GW); or
receiving an establishment request for triggering to establish the S9 session sent by the H-PCRF.

After the H-PCRF is triggered, sending the developed PCC policy to the V-PCRF;
wherein, a triggering condition for the H-PCRF to be triggered comprises: needing to develop PCC for the data of the WLAN Offload connection after receiving traffic information of an Application Function (AF).

The H-PCRF sends the establishment request for triggering to establish the S9 session in the following way, comprising:
the H-PCRF receiving an IP-CAN session establishment request sent by the P-GW, learning the UE accesses the mobile network through WLAN access, and sending the establishment request for triggering to establish the S9 session to the V-PCRF.

The present document also provides a policy control system for a converged network, comprising a Policy and Charging Rules Function (PCRF), the PCRF comprises a user equipment (UE) access sensing module and a subsession establishment module, wherein:
the UE access sensing module is configured to notify the subsession establishment module after learning that a UE accesses a mobile network through wireless local area network (WLAN) access;
the subsession establishment module is configured to establish a subsession serving WLAN Offload and carry a WLAN Offload instruction when establishing an S9 session.

The PCRF also comprises a policy development and distribution module,
the policy development and distribution module is configured to, when triggered, distribute developed policy and charging control (PCC) policy and/or quality of service (QoS) policy over the subsession serving the WLAN Offload.

Carrying the WLAN Offload instruction, comprises:
carrying a WLAN Offload identifier;
carrying a specific subsession ID; or
not carrying information of an access point name (APN).

The UE access sensing module is configured to learn that the UE accesses the mobile network via WLAN access by means of:
receiving a session establishment request sent by an authentication authorization accounting (AAA) server;
receiving a session establishment request sent by a broadband access server or a broadband gateway;
receiving a gateway control session establishment request sent by an ePDG;
receiving an IP-CAN session request from the P-GW; or
receiving an establishment request for triggering to establish the S9 session sent by the H-PCRF.

With the present document, the WLAN offload data can be distinguished from the data routed back to the EPC network in a roaming scenario, thus distributing policy control for the WLAN offload data.

BRIEF DESCRIPTION OF THE DRAWINGS

The accompanying drawings described herein are used to provide a further understanding of the present document, and constitute a part of this application, and the exemplary embodiments of the present document and their description are used to explain the present document but do not constitute a restriction of the present document. In the accompanying drawings.

PREFERRED EMBODIMENTS OF THE INVENTION

Figure 1:
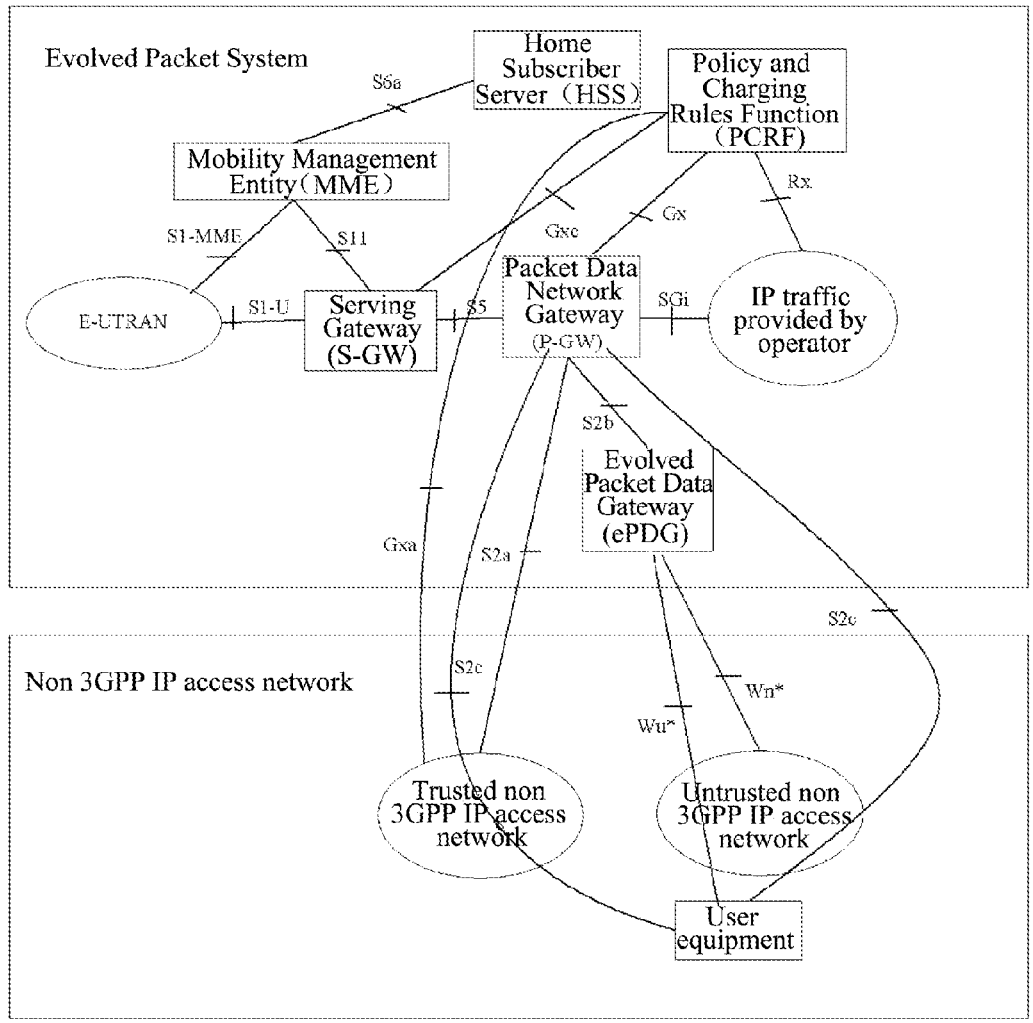
FIG. 1 is a schematic diagram of the EPS system according to the related art.
Figure 2:
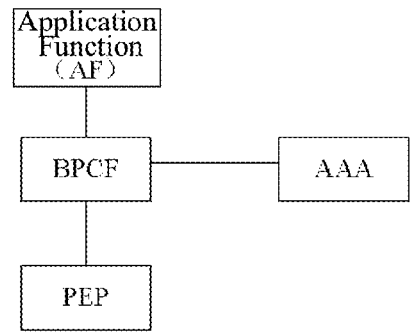
FIG. 2 is a schematic diagram of a BBF BPCF according to the related art.
Figure 3:
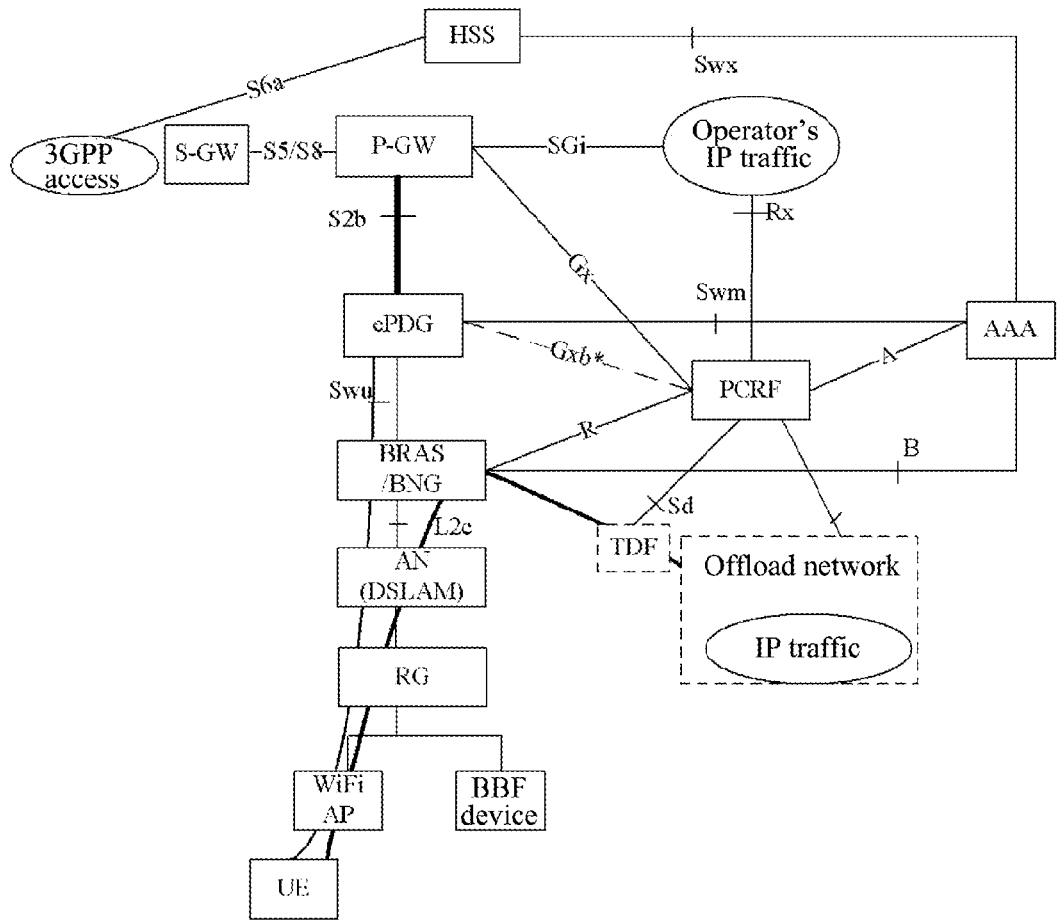
FIG. 3 is a schematic diagram of the UE accessing the EPS core network over the untrusted S2b.
Figure 4:
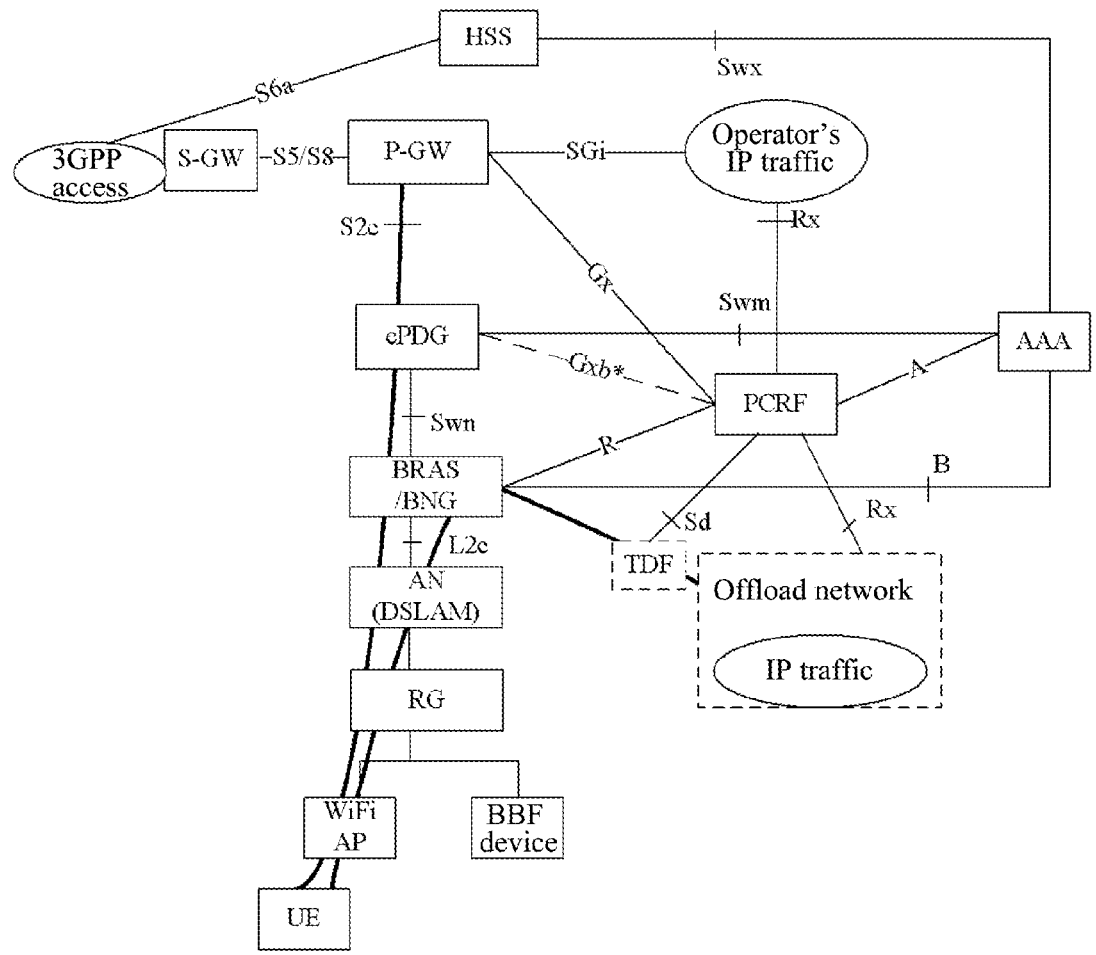
FIG. 4 is a schematic diagram of the UE accessing the EPS core network over the untrusted S2c.
Figure 5:
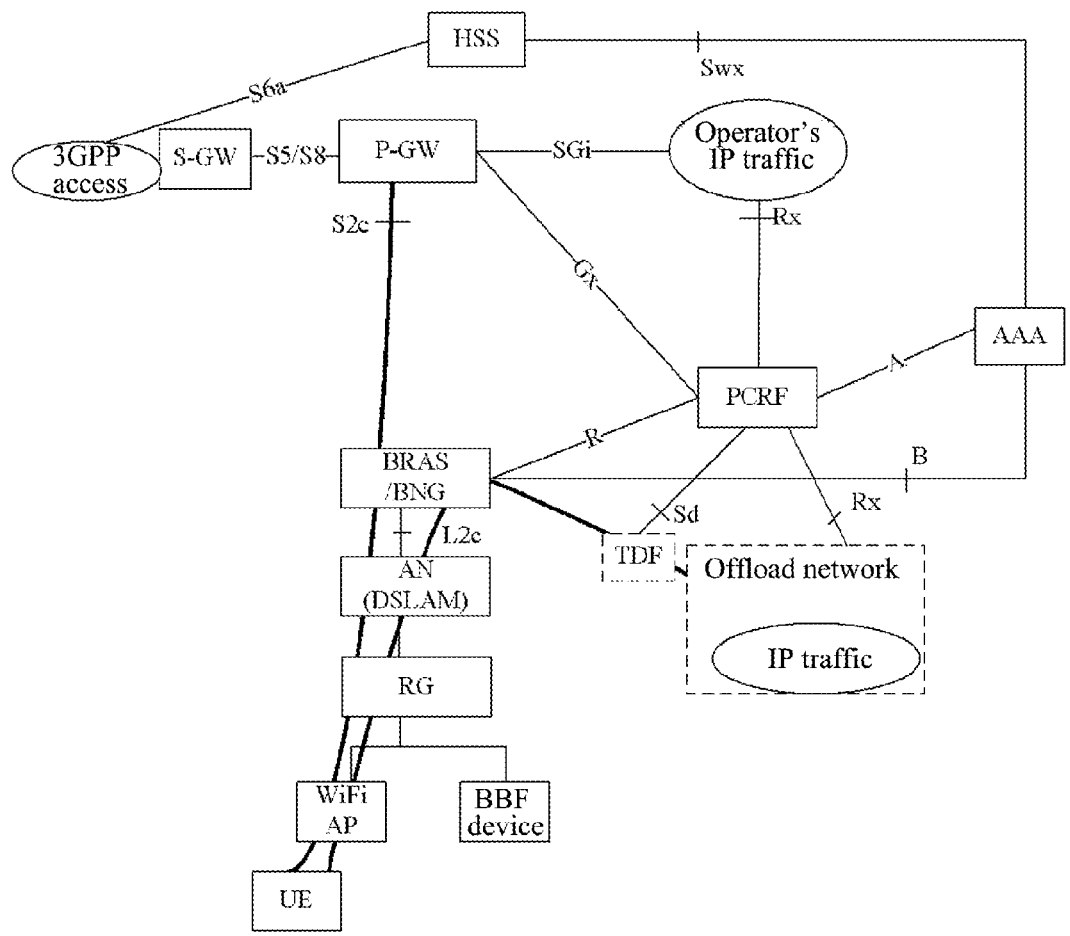
FIG. 5 is a schematic diagram of the UE accessing the EPS core network over the trusted S2c.
Figure 6A:
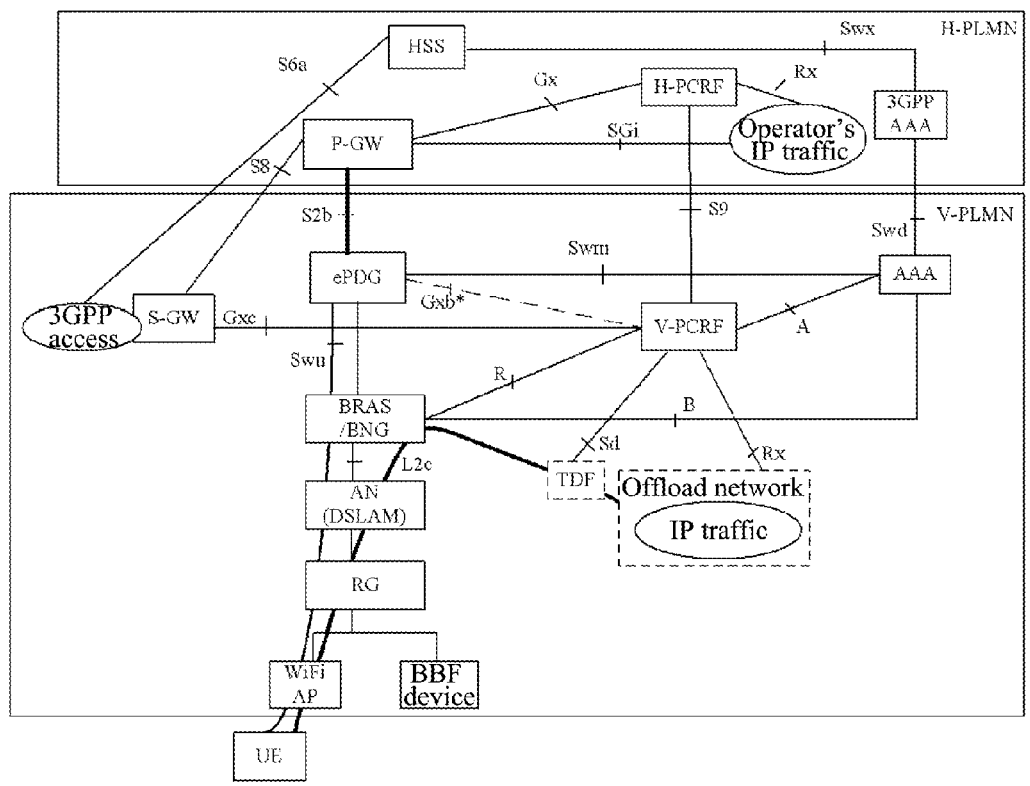
FIG. 6a is a roaming scenario of S2b access in a Home Routed scenario.
Figure 6B:
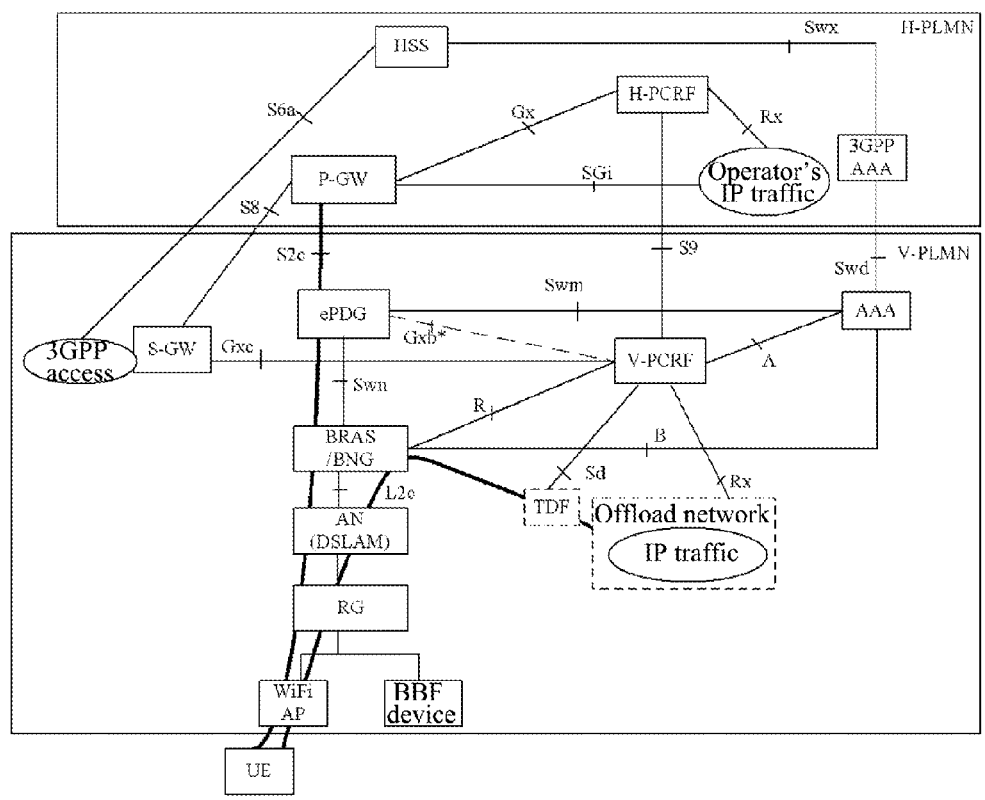
FIG. 6b is a roaming scenario of untrusted S2c access in a Home Routed scenario.
Figure 6C:
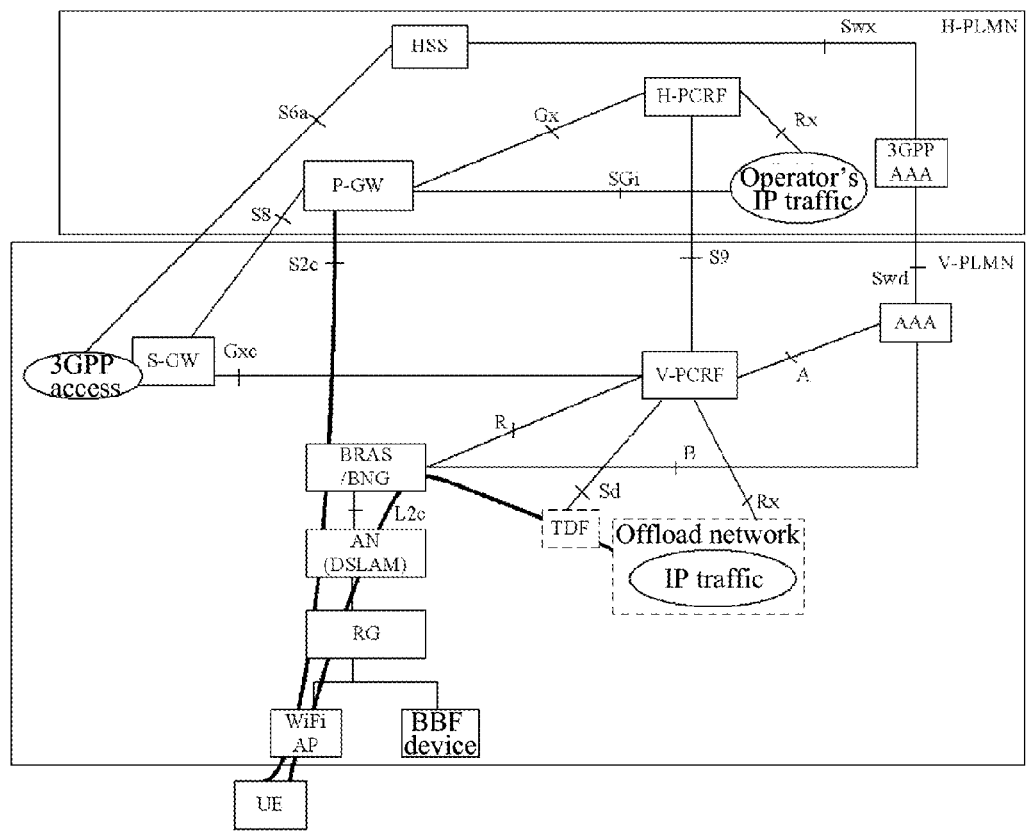
FIG. 6c is a roaming scenario of trusted S2c access in a Home Routed scenario.
Figure 7A:
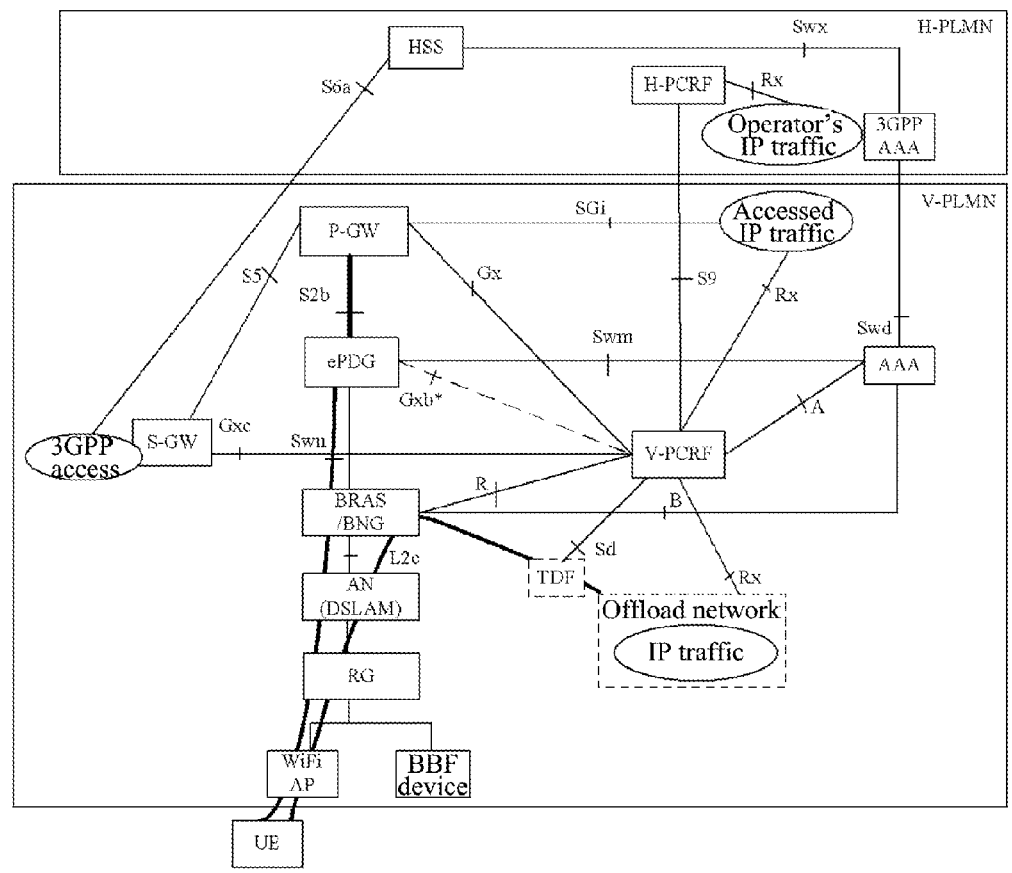
FIG. 7a is a roaming scenario of S2b access in a Local Breakout scenario.
Figure 7B:
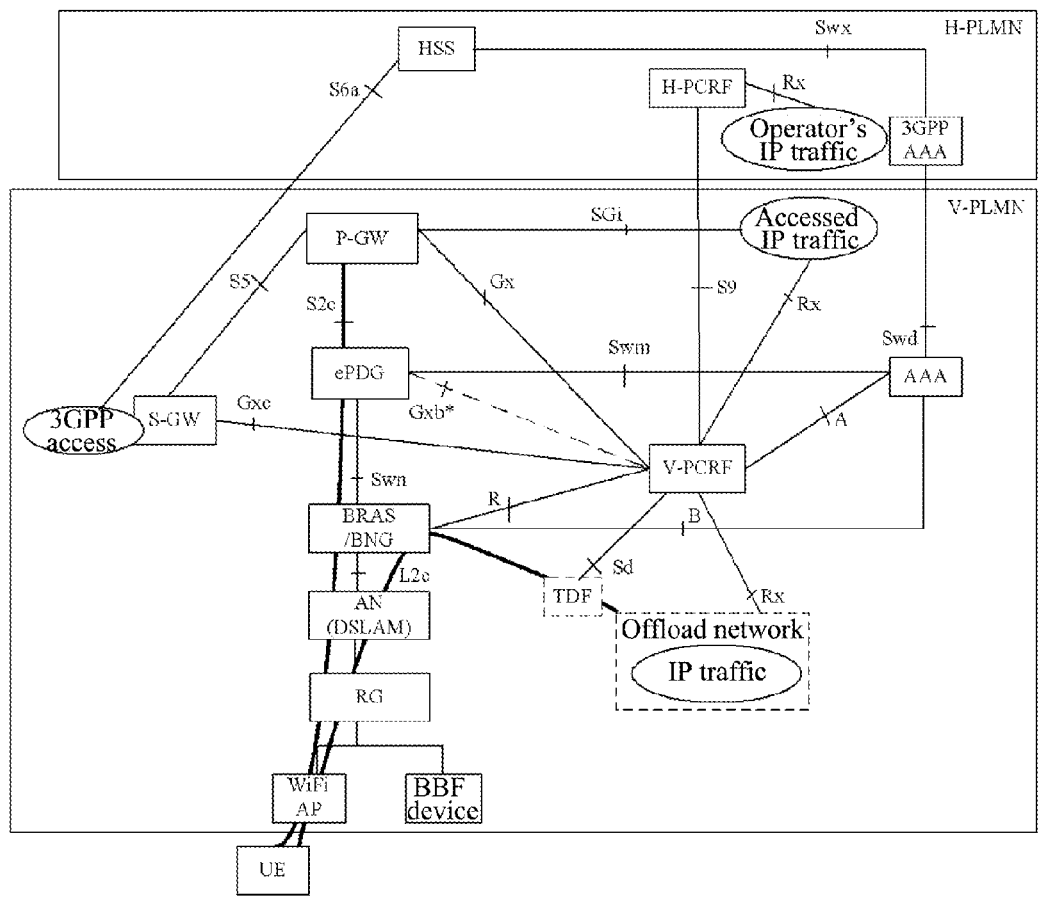
FIG. 7b is a roaming scenario of untrusted S2c access in a Local Breakout scenario.
Figure 7C:
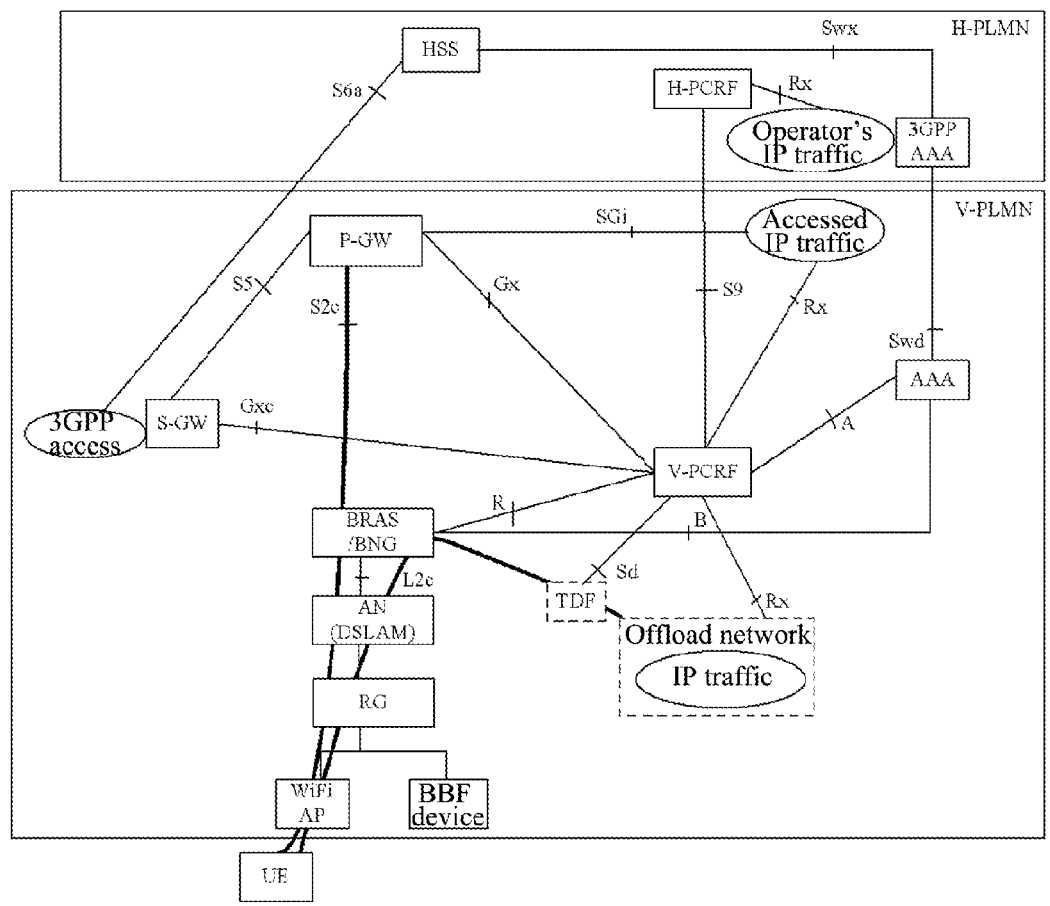
FIG. 7c is a roaming scenario of trusted S2c access in a Local Breakout scenario.

This embodiment provides a policy control method for a converged network, specifically using the following schemes:

In a roaming scenario, after the V-PCRF learns that a UE accesses the mobile network via the WLAN, it establishes an S9 session to the H-PCRF, and establishes a subsession serving the WLAN Offload and carrying a WLAN Offload instruction.

Thereafter, the H-PCRF sends the V-PCRF the developed PCC rules via the subsession established to serve the WLAN Offload.

Wherein, the V-PCRF may carry the WLAN Offload instruction implicitly or explicitly to indicate that the subsession serves the WLAN Offload, for the explicit way, it is to carry a WLAN Offload identifier, or a distributed specific subsession ID;

for the implicit way, the subsession does not contain the APN information; the H-PCRF learns that the subsession serves the WLAN Offload by determining that the subsession does not have the APN information.

Furthermore, the V-PCRF learns that the UE accesses the mobile network via the WLAN in the following way:

receiving a gateway control session establishment request from the ePDG; Gxd session request from the BRAS/BNG; IP-CAN session request from the P-GW; the establishment request for triggering to establish the S9 session sent from the H-PCRF, and the like.

Furthermore, after the H-PCRF is triggered, it distributes the developed PCC policy to the V-PCRF. There are a lot of conditions for triggering the distribution of the PCC rules, for example, after receiving the traffic information of the AF, it needs to develop PCC for data of the WLAN Offload connection; the conditions that may also trigger the subscription change comprise: receiving the traffic information of the AF, and the like.

To make the objectives, technical solutions and advantages of the present document clearer, the examples of the present document will be described in detail below with reference to the drawings. It should be appreciated that, in the case of no conflict, the examples and features in the examples in the present application can be arbitrarily combined with each other.

In a roaming scenario, the S9 interface between the visited V-PCRF and the home H-PCRF is at the UE level, that is, all of the UE's IP-CAN sessions are placed in one S9 session, and since different IP-CAN sessions belong to different PDN connections (that is, distinguished with different APNs), the V-PCRF establishes subsessions for IP-CAN sessions corresponding to different PDN connections, and assigns different subsession IDs to distinguish different subsessions serving different PDN connections; while the UE-level QoS policy is distributed over the command layer parameters in the message (no subsessions will be established for the UE-level QoS policy transmission). The H-PCRF also uses a subsession to distribute PCC policy (including QoS policy and charging policy) for different IP-CAN sessions. Since in a FMC scenario, the WLAN Offload connection does not carry the PDN connection information (no APN), it needs to distinguish the WLAN Offload data in this scenario and distribute policy control for the data.

Embodiment One

The UE accesses the EPS core network via the WLAN access, at this point, the fixed network senses that UE accesses, after the UE completes the access authentication via the fixed network equipment (the authentication process reaches the local AAA Server via the AAA proxy in the roaming network), and the visited AAA proxy can establish a session to the V-PCRF (optional) and notify the user to access, the visited BRAS/BNG establishes a session to the V-PCRF and requests for policies (the V-PCRF can also establish a session to the BRAS/BNG after being triggered by the AAA message and distribute the static configuration policy). The V-PCRF establishes an S9 session to the H-PCRF, even if at this time there is no APN information in the WLAN Offload connection data, the V-PCRF also needs to establish a subsession for the WLAN Offload. In an explicit way, an identifier is carried in the message to inform the H-PCRF that the subsession serves the WLAN Offload, or no identifier is carried, and after the H-PCRF receives the message, it determines that the subsession serves the WLAN Offload according to the information (e.g., no APN information) in the message, the H-PCRF subsequently transfers information of the charging and QoS policies over the subsession.

Figure 8:
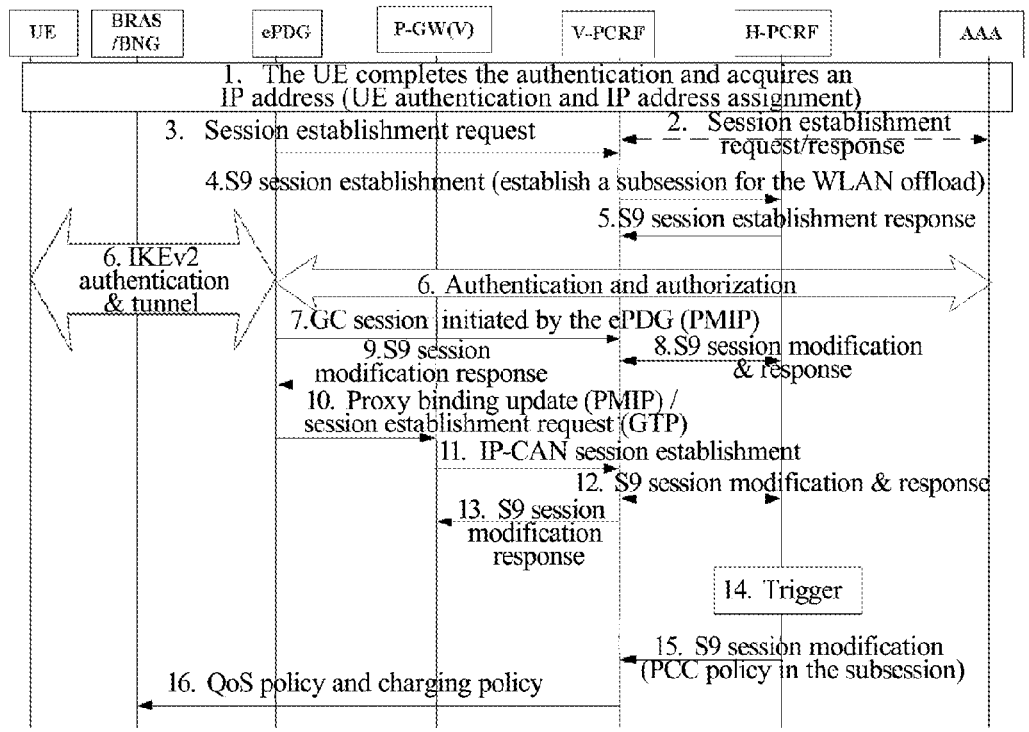
FIG. 8 is a flow chart of S2b access in a Local Breakout scenario in a case that a fixed network senses in accordance with an embodiment of the present document.

As shown in FIG. 8, the process of the present embodiment will be described specifically as follows:

In step 1, the UE accesses the mobile core network through the wireless WLAN, and completes the authentication and obtains the address.

In Step 2, the visited AAA Proxy can establish a session (optional) to the V-PCRF and notify the user to access.

In Step 3, the visited BRAS/BNG establishes a session to the V-PCRF and requests for rules.

Optionally, the V-PCRF can establish a session to the BRAS/BNG after receiving the trigger of the AAA proxy message in step 2, and distribute the rules.

In Step 4, the V-PCRF sends the H-PCRF an S9 session establishment request, and establishes a subsession for the WLAN Offload connection.

In this step, the V-PCRF can use an explicit way, e.g. carrying an identifier or assigning a special subsession ID, to indicate that this subsession serves the WLAN Offload; or can use an implicit way, that is, the H-PCRF judges according to the information in the message (e.g., an access type, not containing the APN information).

In Step 5, the H-PCRF returns an S9 session establishment response to the V-PCRF.

In Step 6, the UE initiates an IKEv2 authentication, and the authentication passes through the ePDG, after the authentication succeeds, the UE obtains an IP address assigned by the mobile network.

After this step, if the PMIP protocol is applied between the ePDG and the P-GW, proceed to the following step 7; if the GTP protocol is applied between the ePDG and the P-GW, it is to directly proceed to step 10.

In Step 7, if the PMIP protocol is applied between the ePDG and the P-GW, the ePDG initiates a Gateway Control Session establishment message and triggers the V-PCRF to initiate an S9 session modification request.

In Step 8, the V-PCRF initiates an S9 session modification request to the H-PCRF, since the message from the ePDG carries the APN information in the S2b access, the V-PCRF assigns a subsession ID to the connection and establishes a subsession.

In Step 9, the V-PCRF returns an S9 session modification response message to the ePDG. In Step 10, if the PMIP protocol is applied between the ePDG and the P-GW, the ePDG initiates a Proxy Binding Update message to the P-GW; if the GTP protocol is applied between the ePDG and the P-GW, the ePDG initiates a session establishment request message to the P-GW.

In Step 11, the P-GW initiates an IP-CAN session establishment request.

In Step 12, if it is the PMIP scenario, since the V-PCRF has already established a subsession for the APN previously, at this point it does not need to establish a subsession to the H-PCRF; if it is the GTP scenario, the V-PCRF needs to establish a new subsession to the H-PCRF for the APN.

In Step 13, the V-PCRF returns a response to the P-GW.

In Step 14, when the H-PCRF is triggered, such as receiving the traffic information from the AF, it needs to develop the PCC (including: QoS policy and charging policy) for the data of the WLAN Offload connection.

In Step 15, the H-PCRF sends the V-PCRF the developed PCC policy over the subsession previously established to serve the WLAN Offload.

In Step 16, after the V-PCRF receives the message, it distributes the PCC policy in the subsession to the BRAS/BNG to be executed.

It should be noted that the abovementioned process is also applicable to the HomeRouted scenario.

Embodiment Two

The UE accesses the EPS core network via the WLAN access, in a HomeRouted roaming scenario, in which the P-GW is in the home network. The fixed network cannot sense that the UE accesses, and the UE accesses via the untrusted S2b or S2c, the UE needs to initiate an authentication to the mobile network, and the authentication passes through the ePDG, after the UE's authentication passes through the AAA in the mobile network, it returns authentication success message. If the PMIP protocol is applied between the ePDG and the P-GW, the ePDG initiates a Gxb* session to the V-PCRF, and the V-PCRF is triggered to establish an S9 session to the H-PCRF; if the GTP protocol is applied between the ePDG and the P-GW, the ePDG sends a session establishment request to the P-GW and triggers the V-PCRF to establish an S9 session to the H-PCRF. At this point, even if no APN information is in the data of the WLAN Offload connection, the V-PCRF still needs to establish a subsession for the WLAN Offload. In an explicit way, the message carries an identifier to indicate the H-PCRF that this subsession serves the WLAN Offload, or the message does not carry an identifier, and after the H-PCRF receives the message, it determines that the subsession serves the WLAN Offload according to the information in the message (e.g., no APN information), the H-PCRF subsequently transfers information of the charging and QoS policies over the subsession.

Figure 9:
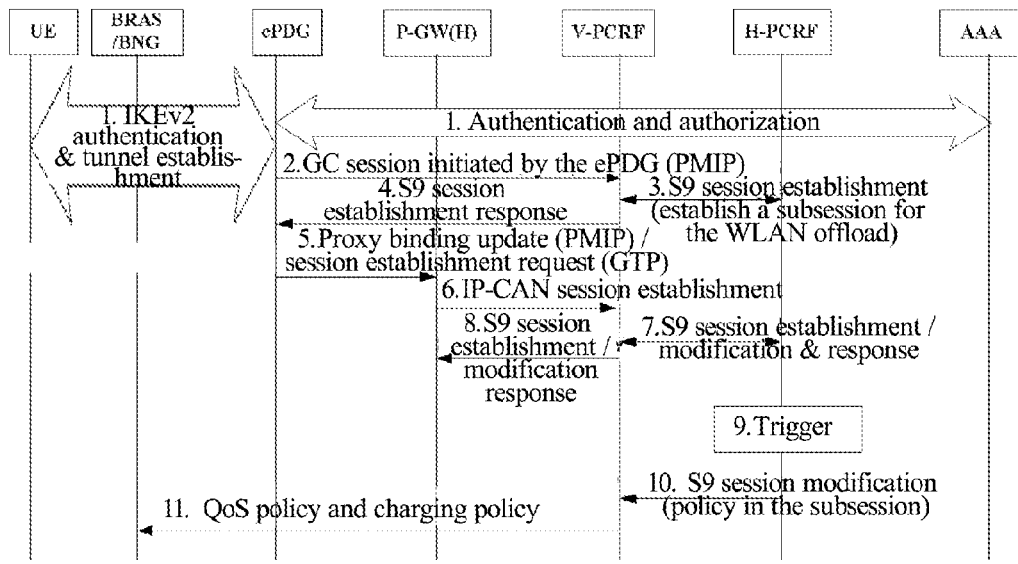
FIG. 9 is a flow chart of S2b and untrusted S2c access in a Home Routed scenario in a case that a fixed network does not sense in accordance with an embodiment of the present document.

As shown in FIG. 9, the process of the present embodiments is described specifically as follows:

In step 1, the UE accesses the mobile core network through the WLAN access, completes the authentication and acquires the address, and the authentication is a tunnel authentication, that is, an authentication when establishing a tunnel to the mobile network, and the authentication passes through the ePDG.

Wherein, if the UE's authentication passes through the AAA, it returns a response to the UE; the UE initiates an IKEv2 authentication, and the authentication passes through the ePDG, after the authentication succeeds, the UE acquires the IP address assigned by the mobile network.

If the PMIP protocol is applied between the ePDG and the P-GW, it is to proceed to the following step 2; If the GTP protocol is applied between the ePDG and the P-GW, it is to directly proceed to step 5.

In Step 2, if the PMIP protocol is applied between the ePDG and the P-GW, the ePDG initiates a Gateway Control Session establishment message.

In Step 3, the V-PCRF initiates an S9 session establishment to the H-PCRF.

In this step, the V-PCRF can use an explicit way, such as carrying an identifier or assigning a special subsession ID to indicate that the subsession serves the WLAN Offload; or it can use an implicit way, where the H-PCRF judges according to the information in the message (e.g., the access type, no APN information).

In Step 4, the V-PCRF returns an S9 session establishment response message to the ePDG.

In Step 5, if the PMIP protocol is applied between the ePDG and the P-GW, the ePDG initiates a Proxy Binding Update message to the P-GW; if the GTP protocol is applied between the ePDG and the P-GW, the ePDG initiates a session establishment request message to the P-GW.

In Step 6, the P-GW initiates an IP-CAN session establishment request.

In Step 7, if it is the PMIP scenario, the V-PCRF send an S9 session modification request, since the V-PCRF established a subsession for the APN previously, it does not need to establish a subsession to the H-PCRF at this point; if it is the GTP scenario, the V-PCRF sends an S9 session establishment request, and it needs to establish a new subsession to the H-PCRF for the APN, and the establishment process is the same as step 3.

In Step 8, the V-PCRF returns to an S9 session establishment/modification response to the P-GW.

In Step 9, when the H-PCRF is triggered, for example, receiving the traffic information from the AF, it needs to develop PCC (including: QoS policy and charging policy) for the data of the WLAN Offload connection.

In Step 10, the H-PCRF sends the V-PCRF the developed PCC policy via the previously established subsession serving the WLAN Offload.

In Step 11, after the V-PCRF receives the message, it distributes the PCC policy in the subsession to the BRAS/BNG to be executed.

The abovementioned process is also applicable to the Local Break out roaming scenario, and at this time the P-GW is in the visited network.

Embodiment Three

The UE accesses the EPS core network via the WLAN access, and in the HomeRouted scenario, the fixed network cannot sense that the UE accesses at this time, since when the UE accesses via the trusted S2c, the UE needs to initiate an authentication to the mobile network, the authentication does not pass through the ePDG, while an AAA authentication is initiated to the mobile network via the P-GW, after the AAA authentication succeeds, it returns an authentication success message. After the H-PCRF receives the message from the P-GW, it triggers to establish an S9 session to the V-PCRF, the V-PCRF is triggered to establish an S9 session to the H-PCRF, even if at this time there is no APN information in the data of the WLAN Offload connection, the V-PCRF also needs to establish a subsession for the WLAN Offload. In an explicit way, the message carries an identifier to notify the H-PCRF that the subsession serves the WLAN Offload, or does not carry the identifier, after the H-PCRF receives the message, it determines that the subsession serves the WLAN Offload according to the information in the message (e.g., no APN information), the H-PCRF subsequently transfers the information of the charging and QoS rules over the subsession.

Figure 10:
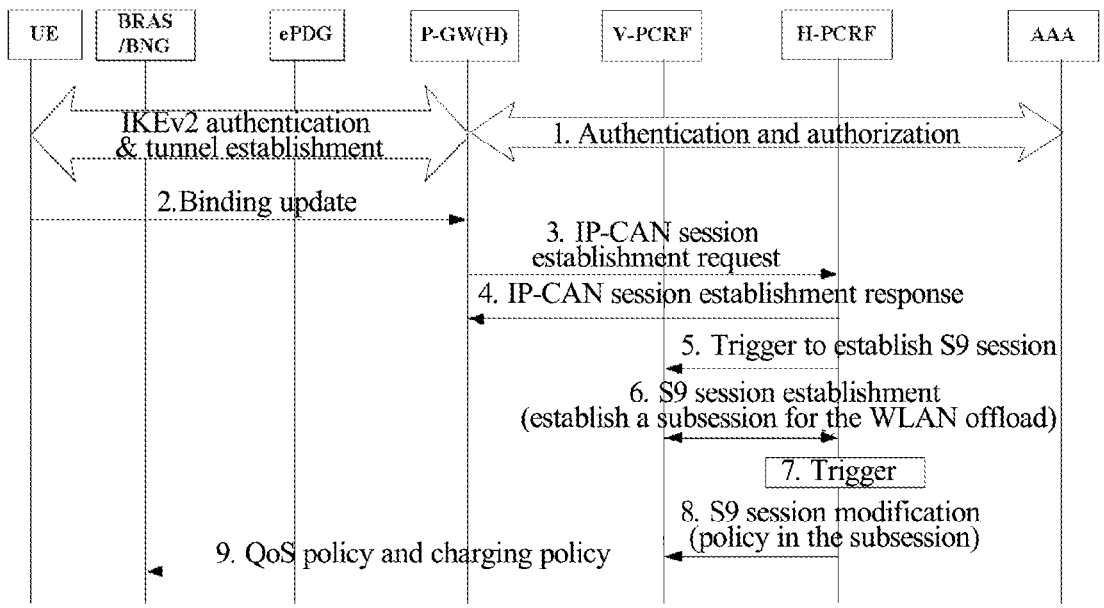
FIG. 10 is a flow chart of trusted S2c access in a Home Routed scenario in a case that a fixed network does not sense in accordance with an embodiment of the present document.

As shown in FIG. 10, the process of the present embodiment is described specifically as follows:

In step 1, the UE accesses the mobile core network through the WLAN access, completes the authentication and obtain an address, the authentication is the tunnel authentication, that is, an authentication when establishing a tunnel to the mobile network. The authentication passes through the P-GW, and if the UE's authentication has passed through the AAA, it returns a response to the UE. The UE acquires the IP address assigned by the mobile network.

In Step 2, the UE initiates a binding update to the P-GW.

In Step 3, the P-GW initiates an IP-CAN session establishment to the H-PCRF.

In Step 4, the H-PCRF returns an IP-CAN session establishment response to the P-GW.

In Step 5, the H-PCRF triggers the V-PCRF to establish an S9 session.

In Step 6, the V-PCRF initiates an S9 session establishment to the H-PCRF.

In this step, the V-PCRF can use an explicit way, such as carrying an identifier or assigning a special subsession ID to indicate that the subsession serves the WLAN Offload; or it can use an implicit way in which the H-PCRF judges according to the information in the message (for example, the access type, no APN information).

In Step 7, when the H-PCRF is triggered, such as receiving the traffic information from the AF, the H-PCRF needs to develop PCC (including QoS policy and charging policy) for the data of the WLAN Offload connection.

In Step 8, the H-PCRF sends the V-PCRF the developed PCC policy over the subsession previously established to serve the WLAN Offload.

In Step 9, after the V-PCRF receives the message, it distributes the PCC policy in the subsession to the BRAS/BNG to execute.

In the Local Breakout scenario, the P-GW is in the visited network, and the P-GW triggers the V-PCRF to establish an S9 session at this point.

Furthermore, the embodiment of the present document also provides a policy control system in the converged network, and this system comprises a PCRF, and the PCRF comprises a UE access sensing module and a subsession establishment module, wherein:

the UE access sensing module is configured to learn that the UE accesses the mobile network via the WLAN access and notify the subsession establishment module;

the subsession establishment module is configured to establish a subsession serving the WLAN Offload when establishing the S9 session, and carry the WLAN Offload instruction.

The PCRF also comprises a policy development and distribution module, the policy development and distribution module is configured to distribute the developed PCC policy and/or QoS policy over the subsession serving the WLAN Offload when triggered.

Carrying the WLAN Offload instruction comprises:

carrying the WLAN Offload identifier; carry the specific subsession ID; or, not carrying the APN information.

The UE access sensing module is configured to learn that the UE accesses the mobile network via the WLAN access in the following way:

receiving a session establishment request sent by an authentication authorization accounting (AAA) server; receive a session establishment request sent by the broadband access server or broadband gateway; receive a gateway control session establishment request sent by the ePDG; receive an IP-CAN session request from the P-GW; or, receive an establishment request for triggering to establish the S9 session sent by the H-PCRF.

The above description is only for preferred embodiments of the present document and not intended to limit the present document. The present document may also have a variety of other embodiments, and without departing from the spirit and essence of the present document, the person skilled in the art can make various corresponding changes and modifications according to the present document. These changes and modifications shall fall within the protection scope of the appended claims of the present document.

Obviously, the person skilled in the art should understand that each above-mentioned module or step in the present document may be implemented with a universal computing device, they can be put together in a single computing device or distributed in a network composed of a plurality of computing devices, optionally, they can be implemented with program codes executable by the computing device, thereby they can be stored in the storage means to be executed by the computing devices. In some cases, the illustrated or described steps may be executed in an order different from what is described here, or they were respectively made into various integrated circuit modules, or a plurality of modules or steps of them are made into a single integrated circuit module to be executed. Therefore, the present document is not limited to any specific combination of hardware and software.

INDUSTRIAL APPLICABILITY

With the present document, the WLAN offload data can be distinguished from the data routed back to the EPC network in a roaming scenario, thus distributing policy control for the WLAN offload data.

What is claimed is:

1. A policy control method for a converged network, comprising:

in a roaming scenario, when receiving an IP connectivity access network (IP-CAN) session request sent by a packet data network gateway (P-GW), a visited policy and charging rules function (V-PCRF) learning that a user equipment (UE) accesses a mobile network through a wireless local area network (WLAN) access, and establishing a subsession serving WLAN Offload when establishing an S9 session to a home policy and charging rules function (H-PCRF), and carrying a WLAN Offload instruction; and the H-PCRF receiving an IP-CAN session establishment request sent by the P-GW, learning that the UE accesses the mobile network through the WLAN access, and sending an establishment request for triggering to establish the S9 session to the V-PCRF.

2. The method according to claim 1, wherein, said carrying WLAN Offload instruction comprises:
carrying a WLAN Offload identifier;
carrying a specific subsession ID; or
not carrying information of an access point name (APN).

3. The method according to claim 2, further comprising:
after being triggered, the H-PCRF sending the developed PCC policy to the V-PCRF;
wherein, a triggering condition for the H-PCRF to be triggered comprises: needing to develop PCC for the data of the WLAN Offload connection after receiving traffic information of an Application Function (AF).

4. The method according to claim 1, further comprising: the H-PCRF sending the V-PCRF a developed policy and charging control (PCC) policy and/or quality of service (QoS) policy over the subsession established for serving the WLAN Offload.

5. A policy control system for a converged network, comprising a Home Policy and Charging Rules Function (H-PCRF), and a Visited Policy and Charging Rules Function (V-PCRF), wherein the V-PCRF comprises a user equipment (UE) access sensing module and a subsession establishment module, wherein:

the UE access sensing module is configured to notify the subsession establishment module after learning that a UE accesses a mobile network through a wireless local area network (WLAN) access;

the subsession establishment module is configured to establish a subsession serving WLAN Offload and carry a WLAN Offload instruction when establishing an S9 session; wherein the UE access sensing module is configured to learn that the UE accesses the mobile network through the a wireless local area network (WLAN) access by receiving an IP-CAN session request from a packet data network gateway (P-GW); and when receiving an IP-CAN session establishment request sent by the P-GW, the H-PCRF learning that the UE accesses the mobile network through the WLAN access, and sending an establishment request for triggering to establish the S9 session to the V-PCRF.

6. The system according to claim 5, wherein the V-PCRF also comprises a policy development and distribution module, the policy development and distribution module is configured to, when triggered, distribute developed policy and charging control (PCC) policy and/or quality of service (QoS) policy over the subsession serving the WLAN Offload.

7. The system according to claim 5, wherein, carrying the WLAN Offload instruction comprises:
carrying a WLAN Offload identifier;
carrying a specific subsession ID; or
not carrying information of an access point name (APN).

* * * * *